Patented June 11, 1940

2,204,323

UNITED STATES PATENT OFFICE 2,204,323

SULPHATION OF HIGHER ALCOHOLS

Earl W. Smith, Philadelphia, Pa., assignor to Röhm & Haas Company, Philadelphia, Pa.

No Drawing. Application January 8, 1937, Serial No. 119,631

9 Claims. (Cl. 260—459)

This invention relates to a method for preparing monoalkyl esters of sulphuric acid and more particularly to such esters as are derived from the higher aliphatic alcohols.

Several methods for sulphating alcohols to obtain the monoalkyl esters have been proposed using various sulphating agents such as oleum, concentrated sulphuric acid, sulphur trioxide, chlorsulphonic acid, etc. Sulphuric acid is the most convenient of these sulphating agents with which to work, but in order to obtain high yields of a relatively pure alkyl sulphuric acid or one of its salts it is necessary to use a large excess of sulphuric acid which is difficult to separate from the alkyl sulphuric acid. It is, therefore, advantageous to employ concentrated sulphuric acid provided a method is available for the separation of the excess acid from the monoalkyl ester.

It is an object of this invention to provide a method whereby a practically complete separation of the excess sulphuric acid from the sulphated alcohol may be realized. This is accomplished by treating an alcohol with an excess of concentrated sulphuric acid at a sufficiently low temperature and for a sufficient length of time to insure as complete a reaction as possible and subsequently adding to the reaction mixture a liquid in which the monoalkyl ester is soluble but which neither dissolves nor reacts with the sulphuric acid or reacts only very slowly. Several organic liquids are available for this purpose among which are benzol, xylol, ethylene dichloride, chloroform, methylcyclohexane, carbon tetrachloride, gasolene and other petroleum distillates, etc. In addition to the absence of any action on sulphuric acid it is also essential for the purposes of the present invention that the liquid chosen be insoluble in water.

The process is carried out in general as follows: One mol of an aliphatic monohydric alcohol is treated with about two mols of 100% sulphuric acid. After standing a sufficient time the reaction mixture is poured slowly into the organic liquid while stirring constantly. This mixture is then allowed to stand until practically all of the unreacted sulphuric acid settles out whereupon it is drawn off. The monoalkyl ester of sulphuric acid remains in the solution. A small amount of water is then added in small portions to the solution and this causes a practically complete separation of the alkyl sulphuric acid, in the form of a thick emulsion, from the organic liquid. The thick emulsion can then be filtered to remove practically all of the organic liquid. Following this more water is added to the emulsion and the alkyl ester of sulphuric acid dissolves along with any small amount of sulphuric acid which may not have been separated by the treatment with the organic liquid. The resulting solution may be evaporated to obtain the pure alkyl sulphuric acid or it may first be neutralized with any desired base so as to obtain a salt of the alkyl sulphuric acid.

This invention may be illustrated by the following examples which, however, are not intended as limitations with respect to the actual alcohols shown, time, temperature or specific organic liquid since the invention may be otherwise practiced within the scope of the appended claims.

Example 1.—49 g. (0.5 mol) of 100% sulphuric acid was cooled to 3° C. and 54 g. (0.25 mol) of technical lauryl alcohol was added all at one time and the mixture stirred vigorously. The temperature rose to 58° C. and the mixture was then cooled to about 20° and allowed to stand one and a half hours, being shaken frequently. After this time a sample was titrated with standard alkali and it was found that the reaction was about 85% complete. The mixture was then placed in a separatory funnel and 380 g. (435 cc.) of benzene added. This mixture was thoroughly shaken and allowed to stand one hour. Most of the sulphuric acid settled out immediately and at the end of the hour it was drawn off. The remaining solution was then transferred to a flask and 85 cc. of water added in 5 cc. portions, shaking thoroughly after each addition. The acid lauryl sulphate forms an emulsion with the water and separates from the benzene which is then completely removed on a suction filter. 165 cc. of water was then added to the residue and a clear solution was obtained. Sodium hydroxide was then added until the solution was pink to phenolphthalein. On neutralization a small amount of benzene separated which was evaporated off on a steam bath. The water was then evaporated leaving practically pure sodium lauryl sulphate.

Example 2.—419 g. (1.9 mols) of lauryl alcohol was added to 373 g. (3.8 mols) of 100% sulphuric acid over a period of about 30 minutes. The temperature rose from 7° C. to about 20° C. thus avoiding the high temperature developed when the alcohol is added rapidly. The product was obtained from this reaction mixture as described in Example 1.

Example 3.—One mol of cetyl alcohol was treated with two mols of 100% sulphuric acid as described in Example 1. The product was substantially pure sodium cetyl sulphate.

*Example 4.*—One mol of butyl alcohol was treated with two mols of 100% sulphuric acid as described in Example 1. The product obtained was substantially pure sodium butyl sulphate.

*Example 5.*—One mol of octyl alcohol was treated with two mols of 100% sulphuric acid as described in Example 1. The product obtained was substantially pure sodium octyl sulphate.

The amount of the excess sulphuric acid which is removed by the organic solvent depends on the nature of the solvent and on the relative amounts of acid and solvent present in the mixture. Technical benzene when used in the ratio of seven parts by weight to one of acid will remove 98 to 100% of the excess acid. Ethylene dichloride requires a ratio of about 10 to 1 in order to remove 90% of the acid and seven parts of xylene will remove about 90% of the sulphuric acid.

I claim:

1. The process for preparing monoalkyl esters of sulphuric acid comprising reacting an aliphatic primary saturated alcohol of at least four carbon atoms with a molecular excess of substantially 100% sulphuric acid to form an alkyl sulphuric acid, extracting said alkyl sulphuric acid by treating the reaction mixture with a water-immiscible organic liquid in which the alkyl sulphuric acid is soluble and the sulphuric acid insoluble and subsequently precipitating the alkyl sulphuric acid from the organic liquid by means of a relatively small amount of water.

2. The process for preparing monoalkyl esters of sulphuric acid comprising reacting an aliphatic primary saturated alcohol of at least four carbon atoms with a molecular excess of substantially 100% sulphuric acid to form an alkyl sulphuric acid, extracting said alkyl sulphuric acid from the reaction mixture by means of benzene and subsequently precipitating the alkyl sulphuric acid from the benzene by means of a relatively small amount of water.

3. The process for preparing the mono-dodecyl ester of sulphuric acid which comprises reacting a dodecyl alcohol with a molecular excess of substantially 100% sulphuric acid and extracting dodecyl sulphuric acid thereby formed by treating the reaction mixture with a water-immiscible organic liquid in which the dodecyl sulphuric acid is soluble and the sulphuric acid insoluble, subsequently precipitating the dodecyl sulphuric acid from the organic liquid by means of a relatively small amount of water.

4. The process for preparing the mono-cetyl ester of sulphuric acid which comprises reacting a cetyl alcohol with a molecular excess of substantially 100% sulphuric acid, and extracting the cetyl sulphuric acid thereby formed by treating the reaction mixture with a water-immiscible organic liquid in which the cetyl sulphuric acid is soluble and the sulphuric acid insoluble, subsequently precipitating the cetyl sulphuric acid from the organic liquid by means of a relatively small amount of water.

5. The process for preparing the mono-butyl ester of sulphuric acid which comprises reacting a butyl alcohol with a molecular excess of substantially 100% sulphuric acid and extracting the butyl sulphuric acid thereby formed by treating the reaction mixture with a water-immiscible organic liquid in which the butyl sulphuric acid is soluble and the sulphuric acid insoluble, subsequently precipitating the butyl sulphuric acid from the organic liquid by means of a relatively small amount of water.

6. The process of separating a primary monoalkyl sulphuric acid of at least four carbon atoms from its solution in an organic liquid immiscible with water which comprises adding to the solution a small amount of water to precipitate said monoalkyl sulphuric acid in a filterable form.

7. The process of separating a primary monoalkyl sulphuric acid of at least four carbon atoms from its solution in benzene which comprises adding to the solution a small amount of water to precipitate said monoalkyl sulphuric acid in a filterable form.

8. The process of separating cetyl sulphuric acid from its solution in benzene which comprises adding to the solution a small amount of water to precipitate cetyl sulphuric acid in a filterable form.

9. The process of separating dodecyl sulphuric acid from its solution in benzene which comprises adding to the solution a small amount of water to precipitate said dodecyl sulphuric acid in a filterable form.

EARL W. SMITH.